United States Patent
Saad

(10) Patent No.: US 11,435,930 B2
(45) Date of Patent: Sep. 6, 2022

(54) INTELLIGENT RECOVERY FROM MULTIPLE CLOUDS COPIES

(71) Applicant: EMC IP Holding Company LLC, Hopkinton, MA (US)

(72) Inventor: Yossef Saad, Ganei Tikva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 20 days.

(21) Appl. No.: 17/023,801

(22) Filed: Sep. 17, 2020

(65) Prior Publication Data

US 2022/0083251 A1 Mar. 17, 2022

(51) Int. Cl.
G06F 3/06 (2006.01)
H04L 43/0888 (2022.01)
H04L 43/50 (2022.01)
H04L 67/1097 (2022.01)

(52) U.S. Cl.
CPC ............ *G06F 3/0647* (2013.01); *G06F 3/065* (2013.01); *G06F 3/067* (2013.01); *G06F 3/0619* (2013.01); *H04L 43/0888* (2013.01); *H04L 43/50* (2013.01); *H04L 67/1097* (2013.01)

(58) Field of Classification Search
CPC ...... G06F 3/0647; G06F 3/0619; G06F 3/065; G06F 3/067; H04L 43/0888; H04L 43/50; H04L 67/1097
See application file for complete search history.

(56) References Cited

U.S. PATENT DOCUMENTS

| | | | |
|---|---|---|---|
| 6,505,216 B1 | 1/2003 | Schutzman et al. | |
| 7,043,504 B1* | 5/2006 | Moore | G06F 11/1471 |
| 8,140,791 B1* | 3/2012 | Greene | G06F 11/1464 |
| | | | 711/162 |
| 9,075,773 B1* | 7/2015 | Rakitzis | G06F 11/2069 |
| 10,691,557 B1* | 6/2020 | Sharma | G06F 11/1469 |
| 2003/0131004 A1* | 7/2003 | Krishna | G06F 16/24556 |
| 2004/0078641 A1 | 4/2004 | Fleischmann | |
| 2004/0181560 A1* | 9/2004 | Romanufa | G06F 16/2358 |
| 2006/0150013 A1 | 7/2006 | Augenstein et al. | |
| 2014/0067763 A1 | 3/2014 | Jorapurkar et al. | |
| 2016/0344707 A1* | 11/2016 | Philipp | H04L 63/06 |
| 2018/0335960 A1* | 11/2018 | Paulzagade | G06F 3/0619 |
| 2020/0012574 A1* | 1/2020 | Srinivasan | G06F 16/178 |
| 2020/0059428 A1* | 2/2020 | Nadeau | H04L 43/0888 |
| 2020/0334112 A1* | 10/2020 | Dhatrak | G06F 11/1469 |
| 2021/0124658 A1* | 4/2021 | Lan | G06F 11/2087 |
| 2021/0303162 A1* | 9/2021 | Liu | G06F 3/067 |

OTHER PUBLICATIONS

Extended European Search Report received for EP Patent Application No. 21197288.0, dated Mar. 2, 2022, 14 pages.

* cited by examiner

*Primary Examiner* — Hiep T Nguyen
(74) *Attorney, Agent, or Firm* — Workman Nydegger

(57) ABSTRACT

Data protection operations including recovery operations are disclosed. A recovery operation is performed by downloading the backup to be recovered from multiple identical copies of the backup. Based on factors such as throughput, an optimal amount of data can be downloaded from each of the multiple copies. The portions downloaded from the multiple copies are rebuild or reassembled once downloaded. The assembled backup is then presented to a target for recovery.

18 Claims, 3 Drawing Sheets

INTELLIGENT RECOVERY FROM MULTIPLE CLOUDS COPIES

FIELD OF THE INVENTION

Embodiments of the present invention generally relate to data protection. More particularly, at least some embodiments of the invention relate to systems, hardware, software, computer-readable media, and methods for data protection operations such as recovery operations from multiple backups.

BACKGROUND

Data is a crucial aspect of many organizations. Because there is a possibility for data to be lost, corrupted, or compromised, these organizations typically ensure that their data is protected in some manner. Generally, this means that a backup (a copy) of the data is available or can be generated. Often, the backup copy of the data is stored in the cloud (e.g., a datacenter).

Backups, however, do not come without costs of various kinds. In addition to the monetary cost associated with backing up the data/application (e.g., software, storage space, time), there are also costs associated with restoring the data in terms of time and money.

For example, the ubiquity of the cloud has made storage widely available. Notwithstanding the availability of cloud storage, a recovery operation takes time. In cases where a significant amount of data needs to be restored, the data may be recovered from the cloud. This results in a need to transfer the data over a network such as a Wide Area Network (WAN). Because a WAN is typically not as fast as LAN/SAN connectivity, substantial time may be required. For example, recovering 10 Terabytes (TB) of data over a 1 Gb/s link may require approximately 27 hours. This corresponds, potentially, to 27 hours of downtime.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
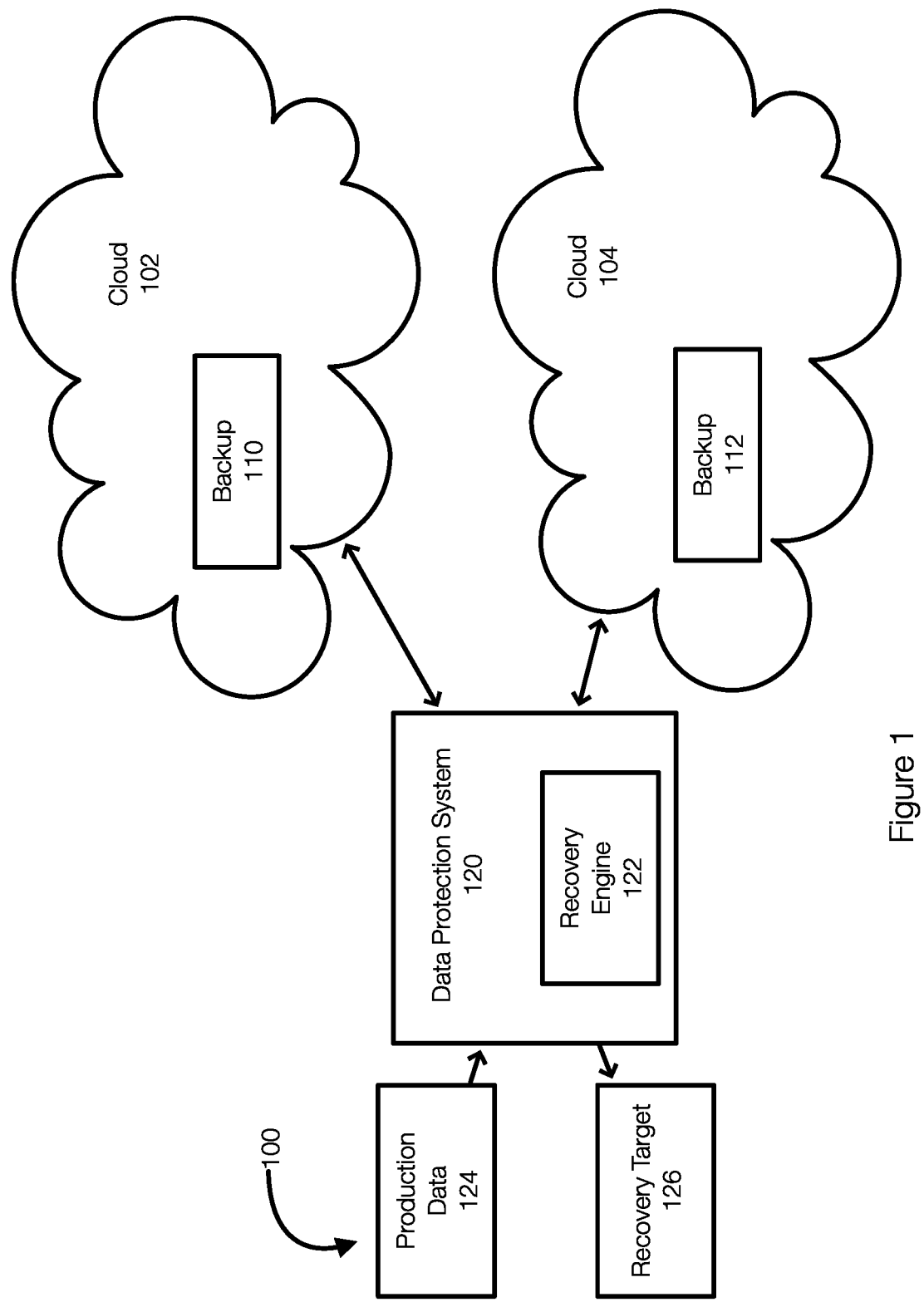
FIG. 1 discloses aspects of an environment for performing a data protection operation including downloading a backup or portions thereof from multiple copies.

Embodiments of the present invention generally relate to data protection operations that are referred to generally as backup and restore operations. More particularly, at least some embodiments of the invention relate to systems, hardware, software, computer-readable media, and methods for recovery or restore operations from multiple backup copies.

Examples of data protection operations include, but are not limited to, backup operations, recovery operations, restore operations, storage operations, copy operations, or the like or combination thereof. Embodiments of the invention more specifically relate to performing recovery operations and to operations for downloading backups or to transferring data from at least one backup site to a production site. Embodiments of the invention perform intelligent parallel recovery from multiple copies (when available). The parallel recovery operations are configured to download the backup or other data in a shortest time such that downtime is reduced or minimized.

In one embodiments, multiple copies or backups of production data may be stored in or by a data protection system. While some of these copies may correspond to different points-in-time, some of these copies may correspond to the same point in time. For example, many organizations, due to regulations, internal procedures, or for other reasons, may store multiple copies of the same backup. For example, the same backup or copy of data may be stored in a in different clouds (e.g., AWS and Azure), different regions of the same cloud, or the like.

The manner in which the data is stored may allow for any point in time to be recovered. In accordance with embodiments of the invention, two or more different backup locations or backups can be used to recover to the same point in time. In some examples, backups may be stored in relatively discrete increments. When a specific backup is selected for recovery, the same backup at the various backup locations may be used. When data is backed up in a manner that allows for any PiT recovery, the same PiT may be used from each of the backup locations.

Embodiments of the invention, when performing a recovery operation, may perform a parallel download. In other words, because the identical copies exist at more than one location, data may be downloaded from each of these locations in parallel. Different data, however, is downloaded from each of the copies. The parallel download operation can be optimized to reduce the overall download time. In particular, the data protection system may account for the effective download throughput from various clouds (which can vary from one cloud to the next). For example, the data protection system may account for factors or characteristics such as link bandwidth, latency, cost, or the like. This allows the data protection system to determine how much of the data should be downloaded from each of the locations that has a copy of the production data.

Embodiments of the invention can be implemented as a stand-alone proxy machine, as an integrated capability within a data protection system. Example data systems include, but are not limited to, PowerProtect Data Manager (PPDM), RecoverPoint for VMs, or the like.

FIG. 1 illustrates an example of a production site or system 100. The production system may be an on-premise system, a cloud-based system, or the like or combination thereof. The system 100 may also be geographically distributed. The system 100 is associated with production data 124 that represents the actual or working data of the system 100. The production data 124 may include data, applications, or the like and may be implemented in physical and/or virtual systems.

The data protection system 120 is configured to perform data protection operations with respect to the production data 124. This may include, for example, backing up the production data 124, which may include backing up virtual machines or other data systems or implementations.

In this example, more than one copy of each backup of the production data is created by the data protection system 100. A backup 110 is stored in a cloud 102 and a backup 112 is stored in a cloud 104. The backups 110 and 112, in one example are the same backup. Thus, the backup 112 is a copy of the backup 110.

The cloud 102 and the cloud 104 may be the same cloud, different regions of the same cloud, different clouds, or the like. Other backups may also be stored in the clouds 102, 104 that may correspond to different points in time. The backups 110 and 112 may be configured such that any point in time (PiT) can be generated therefrom. Thus, the same PIT backup can be generated from distinct backups.

The data protection system 120 may include hardware and/or software. The data protection system 120 may be implemented as an appliance, as software, or the like. The backups 110 and 112 may be stored as objects, files, blocks, block devices, or the like.

In one example, the production data 124 may need to be recovered from a backup. Embodiments of the invention can reduce the downtime associated with the recovery operation by downloading a part of the backup from the backup 110 and a part of the backup from the backup 112. The portions are then combined or rebuilt once these portions are downloaded.

As previously stated, however, the backup 110 is the same as or identical to the backup 112. In one example, the same data may be stored in the backups 110 and 112 even if the format is different (e.g., due to cloud infrastructure or systems).

Although FIG. 1 only illustrates two copies, any number of backup copies may exist.

The data protection system 120 may include a recovery engine 122 that is configured to perform a recovery operation or at least to perform a download operation of the backup from multiple copies.

Initially, the recovery engine 122 is provided with a location of the copies (e.g., address, identifiers, or the like). The locations may be denoted as $L_i$: $1 \leq i \leq N$. Further the size of each of the identical copies is defined as S bytes.

The recovery engine 122 may connect with the cloud 102 and the cloud 104 or, more specifically, may connect to and access the backups 110 and 112. The recovery engine 122 may perform a speed test to verify download throughput from each of the locations. The throughput from each location $L_i$ is referred to as $T_i$ and may be measured in bytes/second or other metric.

When there is a request from the data protection system 120 to perform the recovery of an object, file, or block device, the recovery engine 122 may determine an optimal recovery configuration with respect to the backup copies as follows:

The amount to download from location j is:

$$D_j = S * T_j / \Sigma T_i \; (i=1 \ldots N).$$

The recovery engine 122 may then logically split the copy into N segments, with size of segment j being $D_j$. This segmentation may depend on the type of storage. For individual entities like files or many objects, the segmentation is the closest approximation using full files or objects. For large sequential entities like block volumes or very large files, the segmentation is segments of continuous or contiguous bytes starting at a specific offset and with a length of $D_j$.

The recovery engine 122 then proceeds to download, simultaneously or in parallel, the segments $D_j$ from the respective backup copies. More specifically, the recovery engine 122 may download first segment(s) from a first backup copy, second segments from a second backup copy, etc. Byway of example only, the recovery engine 122 may then rebuild a full copy locally by combining all of the segments before providing the full copy of the backup to the data protection system, to the application, or the like.

In FIG. 1, assuming that the clouds 102 and 104 have similar or substantially the same characteristics relevant to downloading data from the backups, the recovery engine 122 may download a first half of the backup from the backup 110 and a second half of the backup from the backup 112. If the cloud 102 has a higher throughput, a larger portion of the backup may be downloaded from the backup 110.

The recovery engine 122 may account for the factors of the clouds 102 and 104 and assign segments to download accordingly such that the download time is minimized. Embodiments of the invention thus perform a download analysis based, at least in part, on the effective download throughput of multiple sites and allocate segments to be downloaded from the various sites.

In another example, the data or backup copies stored in the different clouds may be deduplicated. By way of example only, data can be deduplicated by dividing the data into blocks and creating a hash or other signature for each of the blocks. This allows the allocation of which blocks to download from which backup copies to be determined based on signatures or hashes. For example, the recovery engine 122 may download a first range of hashes from the backup 110 and a second range of hashes from the backup 112. The hashes associated with the backup may be determined from a manifest or other metadata that identifies the hashes for a particular backup. The In the context of a distributed systems, the clouds 102 and 104 can be queried to determine which blocks or data they store. For example, a centralized metadata server may identify the hashes or signatures that pertain to a particular backup. Each of the clouds or sites can be queried (this information may also be present at the metadata server) to determine where the various blocks of the backup being restored are located. The recovery engine 122 can then download the various blocks from the various sites or clouds based on their effective throughput. This allows embodiments of the invention to download from multiple copies based on hash tables rather than addresses and offsets (which may also be used). The hashes can be ordered even if the hashes are not sequential. This allows the recovery engine 122 to download specific ranges from specific backup copies.

Figure 2:
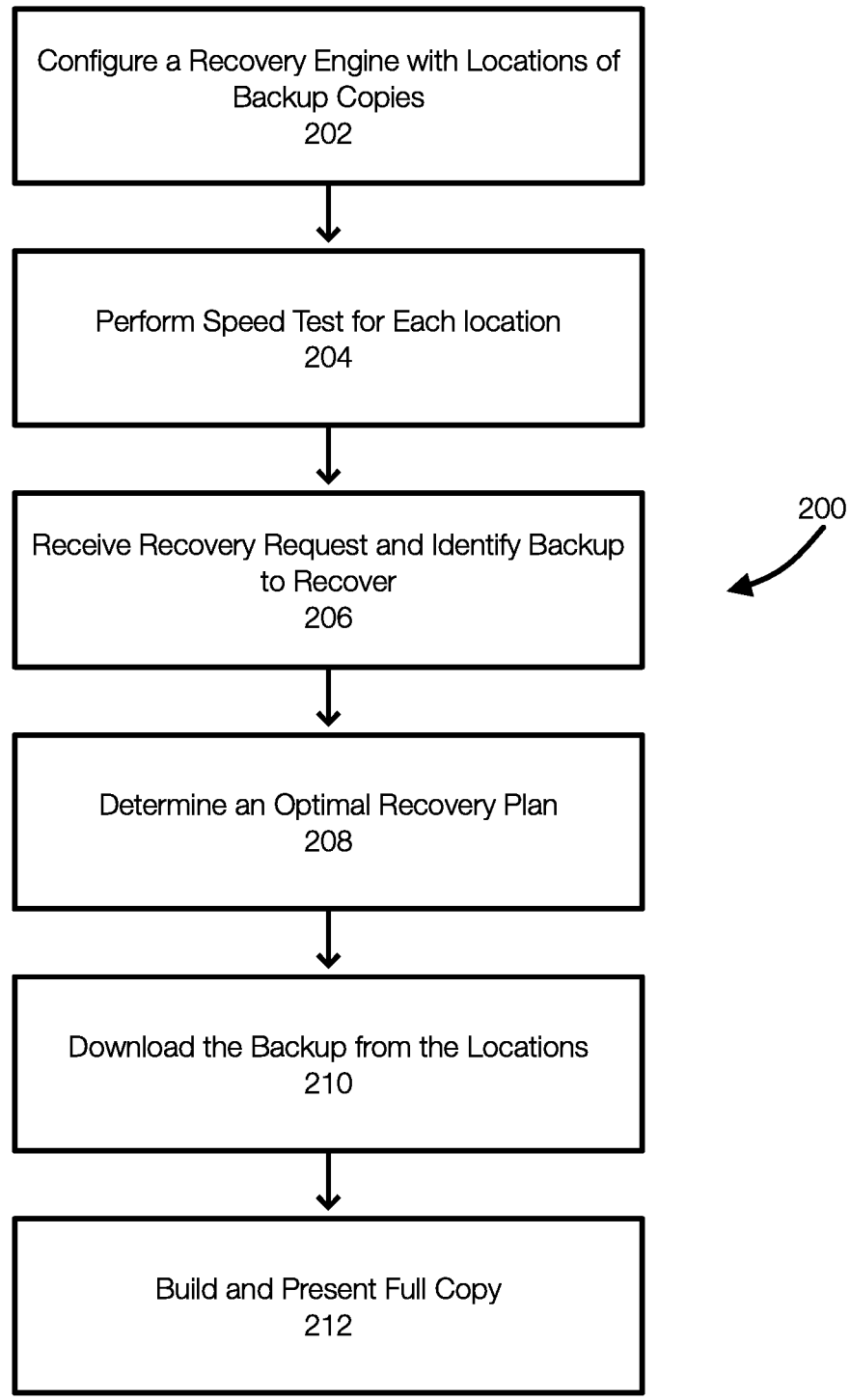
FIG. 2 discloses aspects of a method for performing a data protection operation including recovering a backup from multiple copies.

FIG. 2 illustrates an example of a method for performing a data protection operation such as a recovery operation where the data is recovered from multiple backup copies. The method 200 may include configuring 202 a recovery engine with locations of the backup copies. The locations can be provided in a variety of ways. The locations may include a URL (Uniform resource locator), addresses, identifiers (e.g., hashes), or the like. The recovery engine may query a metadata server for the locations of the backup copies.

The location information provided to or derived by the recovery engine is sufficient for the recovery engine (or more generally the data protection system) to access the backup copies at each location. In some example, the locations may already be available or known. The locations available to the recovery engine may be updated as necessary.

Next, the recovery engine may perform 204 a speed test for each location at which copies of the backup are stored. In one example, a speed test may be performed for each location that has a copy of the backup being recovered. This process of determining download throughput may be performed regularly such that the speed or download throughput is readily available in the event of a recovery operation.

The configuration of the recovery engine and the throughput or speed determination may be considered as preliminary or preparatory aspects of embodiments of the invention in that they can be performed in advance if necessary. Assuming that a sufficiently recent speed determination is available, the recovery operation may begin when a recovery request is received 206 by the data protection system. Determining that a recovery operation needs to be performed is an example of receiving a recovery request. When the request is received, a backup to recover (or portion thereof) may be selected or identified. This identification may be performed automatically (e.g., most recent valid backup) or manually identified.

The recovery operation next determines 208 an optimal recovery plan. The optimal recovery plan is based on the results of the speed test. The results may be the most recent results or may be an average of a number of speed tests, which may account for network variability. The speed test may account for distance and other network factors as well.

Determining the optimal recovery plan may also include determining which data (e.g., how much data) is downloaded from which location or from which backup copy. The amount to download from each backup copy (or the backup copies being used for the recovery) is typically based on the size of the backup and the throughput measurements of the various locations. In one example, the backup copy is downloaded from N backup copies. The backup copy is essentially split into N segments and a different segment is retrieved from each of the N locations. The segments downloaded from the backup copies may be of different sizes. The segments can be downloaded in parallel. This reduces the downtime compared to a situation where the recovery operation downloads the entire backup from the same single copy.

Thus, the segment downloaded from a particular location can be expressed in different manners. For object and file-based storage, each segment may include a certain number of objects (based on size). In other words, if the recovery engine downloads 1 GB from a first copy, the size of the objects downloaded from that copy is approximately 1 GB. The objects or files are not split in this case. Thus, the actual amount downloaded may be less than or greater than 1 GB.

In another example, if the data is associated with block volumes or are very large files, amount to download may be specified as a multiple of the corresponding block size. If the data to download from a first copy is 1 GB and the block size is 4 MB, then 250 blocks are downloaded from the first copy. The next set of blocks may be downloaded from a second copy. Further, the data may be downloaded based on addresses and/or offsets.

Thus, the amount of data actually downloaded from each copy may be different from the assigned amount. Further, the recovery engine may download different data amounts from the locations.

After the optimal recovery plan is determined, the backup is downloaded 210 from the locations by the recovery engine. In one example, if N locations are connected to or available to the data protection system or to the recovery engine by a similar bandwidth connection, the recovery time and downtime can be reduced by a factor of N.

Once the segments or portions of the backup are downloaded from the locations or backup sites, the segments or portions are assembled or rebuilt into a local copy (e.g., written to a volume). The rebuilt copy can then be presented 212 to the production system or restored to the production system to a target system for example. With reference to FIG. 1, the local copy may be stored on a recovery target 126. This allows the production data to be restored as the target data from multiple backup copies.

In particular, one advantageous aspect of at least some embodiments of the invention is that the downtime can be reduced by downloading from multiple locations and using multiple copies of the same backup.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations, which may include, but are not limited to, data read/write/delete operations, data deduplication operations, data backup operations, data restore operations, data cloning operations, data archiving operations, recovery operations, downloading operations, disaster recovery operations, recovery operations from multiple copies, or the like. More generally, the scope of the invention embraces any operating environment in which the disclosed concepts may be useful.

At least some embodiments of the invention provide for the implementation of the disclosed functionality in existing backup platforms, examples of which include the RecoverPoint for VMs or PPDM.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, journaled backups, PiT backups, and incremental or differential backups.

Figure 3:
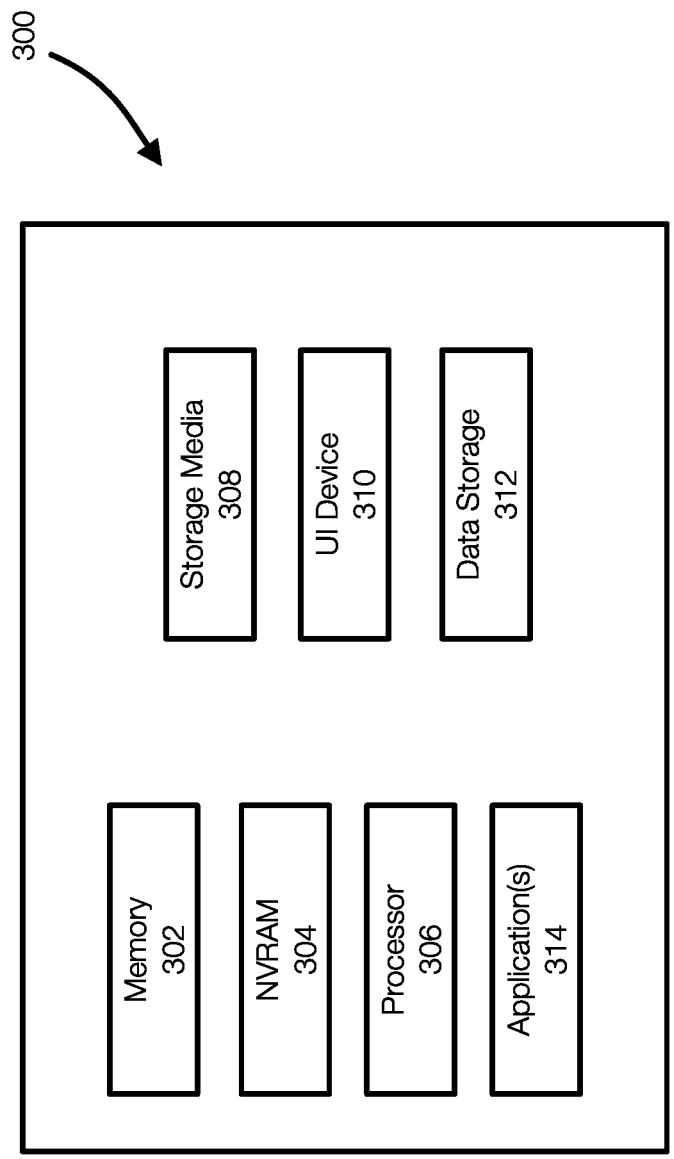
FIG. 3 discloses aspects of a physical computing environment.

With reference briefly now to FIG. 3, any one or more of the entities disclosed, or implied, by the Figures and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

Following are some further example embodiments of the invention. These are presented only by way of example and are not intended to limit the scope of the invention in any way.

Embodiment 1. A method, comprising: receiving a request to perform a recovery operation, determining a plan for recovering a backup from multiple copies of the backup, downloading, in parallel, a portion of the backup from each of the multiple copies in accordance with the plan, wherein a different portion is downloaded from each of the multiple copies, rebuilding the backup from the portions downloaded from the multiple copies, and recovering the rebuild backup, for example at a production system.

Embodiment 2. The method of embodiment 1, further comprising connecting to each location that stores one of the multiple copies of the backup and performing a speed test for each location to determine a throughput for each location.

Embodiment 3. The method of embodiments 1 and/or 2, further comprising determining storing a history of speed test results for each location.

Embodiment 4. The method of embodiments 1, 2, and/or 3, wherein the plan is based on the throughput of each location or based on an average associated with the history.

Embodiment 5. The method of embodiments 1, 2, 3, and/or 4, further comprising identifying the locations of the multiple copies of the backup.

Embodiment 6. The method of embodiments 1, 2, 3, 4, and/or 5, further comprising downloading different data amounts from at least some of the multiple copies.

Embodiment 7. The method of embodiments 1, 2, 3, 4, 5, and/or 6, wherein the multiple copies are identical.

Embodiment 8. The method of embodiments 1, 2, 3, 4, 5, 6, and/or 7, where the multiple copies are stored as objects or files, formulating the plan such that the portions include whole objects or files.

Embodiment 9. The method of embodiments 1, 2, 3, 4, 5, 6, 7, and/or 8, wherein at least some of the portions are less than or greater than an assigned amount.

Embodiment 10. The method of embodiments 1, 2, 3, 4, 5, 6, 7, 8, and/or 9, wherein the portion of the backup is based on the size of the backup and a ratio of the throughput to a sum of all throughputs.

Embodiment 10. A method for performing any of the operations, methods, or processes, or any portion of any of these, disclosed herein.

Embodiment 11. A non-transitory storage medium having stored therein instructions that are executable by one or more hardware processors to perform the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a request to perform a recovery operation;
   determining a plan for recovering a backup from multiple copies of the backup, wherein each of the multiple copies is identical;
   downloading, in parallel, a portion of the backup from each of the multiple copies in accordance with the plan, wherein a different portion of the backup is downloaded from each of the multiple copies;
   rebuilding the backup from the portions downloaded from the multiple copies; and
   recovering the rebuilt backup.

2. The method of claim 1, further comprising connecting to each location that stores one of the multiple copies of the backup and performing a speed test for each location to determine a throughput for each location.

3. The method of claim 2, further comprising storing a history of speed test results for each location.

4. The method of claim 3, wherein the plan is based on a throughput of each location or based on an average throughput associated with the history.

5. The method of claim 1, further comprising identifying the locations of the multiple copies of the backup.

6. The method of claim 1, further comprising downloading different data amounts from at least some of the multiple copies.

7. The method of claim 1, wherein the multiple copies are stored as objects or files, further comprising formulating the plan such that the portions include whole objects or files.

8. The method of claim 7, wherein at least some of the portions are less than or greater than an assigned amount.

9. The method of claim 1, wherein each of the multiple copies is associated with a throughput, wherein the portion of the backup retrieved from each of the multiple copies is based on the size of the backup and a ratio of a corresponding throughput to a sum of all throughputs.

10. A non-transitory storage medium having stored therein instructions that are executable by one or more hardware processors to perform operations comprising:
    receiving a request to perform a recovery operation;
    determining a plan for recovering a backup from multiple copies of the backup, wherein each of the multiple copies is identical;
    downloading, in parallel, a portion of the backup from each of the multiple copies in accordance with the plan, wherein a different portion of the backup is downloaded from each of the multiple copies;
    rebuilding the backup from the portions downloaded from the multiple copies; and
    recovering the rebuilt backup.

11. The non-transitory storage medium of claim 10, further comprising connecting to each location that stores one of the multiple copies of the backup and performing a speed test for each location to determine a throughput for each location.

12. The non-transitory storage medium of claim 11, further comprising storing a history of speed test results for each location.

13. The non-transitory storage medium of claim 12, wherein the plan is based on a throughput of each location or based on an average throughput associated with the history.

14. The non-transitory storage medium of claim 10, further comprising identifying the locations of the multiple copies of the backup.

15. The non-transitory storage medium of claim 10, further comprising downloading different data amounts from at least some of the multiple copies.

16. The non-transitory storage medium of claim 10, where the multiple copies are stored as objects or files, further comprising formulating the plan such that the portions include whole objects or files.

17. The non-transitory storage medium of claim 16, wherein at least some of the portions are less than or greater than an assigned amount.

18. The non-transitory storage medium of claim 10, wherein each of the multiple copies is associated with a throughput, wherein the portion of the backup retrieved from each of the multiple copies is based on the size of the backup and a ratio of a corresponding throughput to a sum of all throughputs.

* * * * *